Feb. 21, 1928.
G. K. LISK
1,659,954
LUBRICATING SYSTEM
Filed Sept. 2, 1925
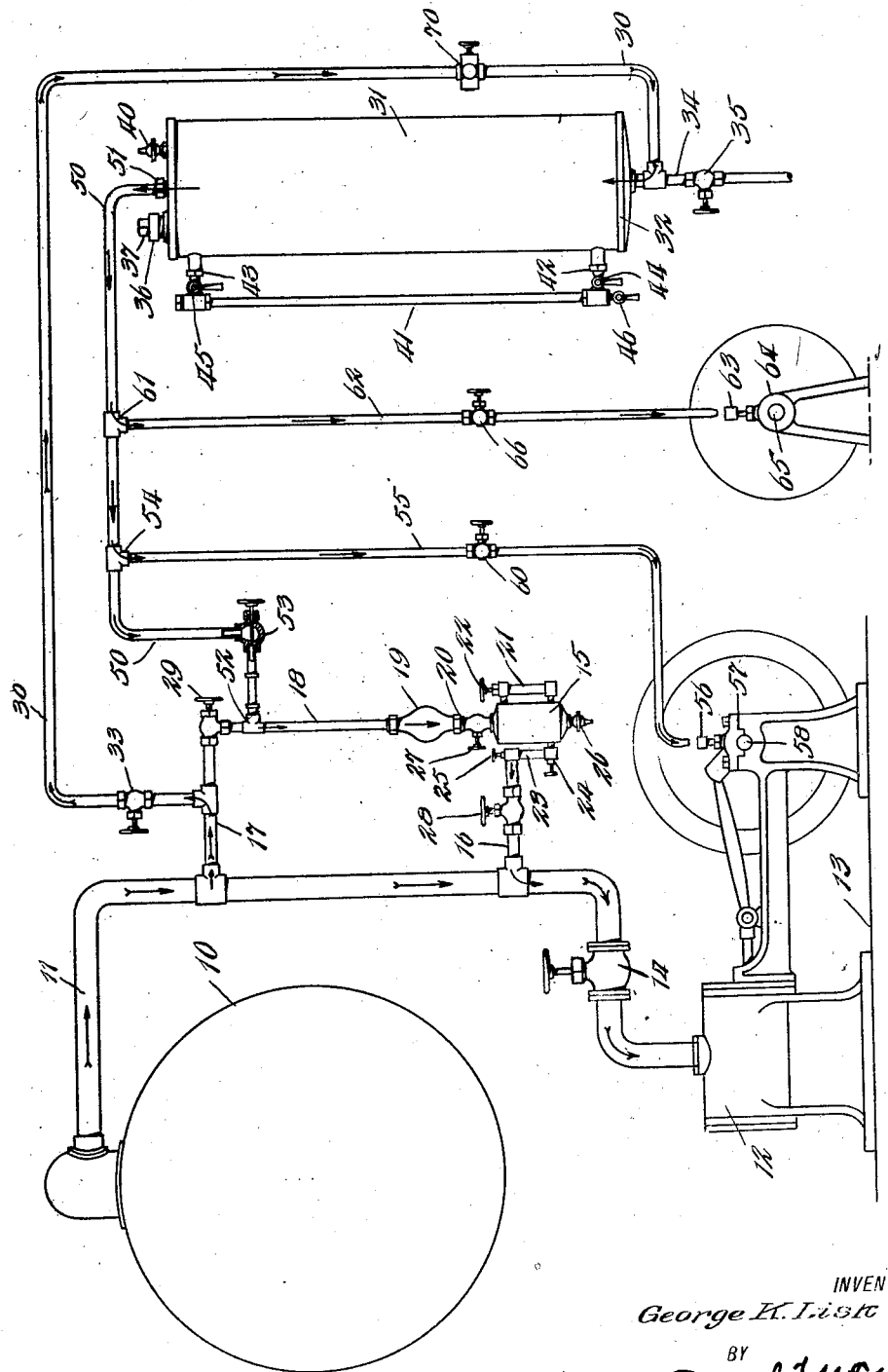
INVENTOR
George K. Lisk
BY
Joseph T. McMaier
ATTORNEY Patented Feb. 21, 1928.

1,659,954

UNITED STATES PATENT OFFICE.

GEORGE K. LISK, OF RICHMOND HILL, NEW YORK.

LUBRICATING SYSTEM.

Application filed September 2, 1925. Serial No. 54,051.

My invention relates to lubricating systems and more particularly to systems auxiliary to the usual engine lubricator, which may be coupled thereto and operated under pressure from the engine steam supply, to automatically, continuously furnish a controlled feed of lubricant to the interior and exterior bearings of the engine, or to other driven machinery. Still more particularly, my invention relates to a steam pressure operated system of this character having a comparatively large lubricant storage reservoir so piped up to the usual lubricator and engine bearings and to other driven machines, that a continuous controlled supply of lubricant will be automatically provided to the engine and other machines without the usual necessity of frequently manually filling the lubricator or locally distributed oil cups.

In the heretofore known art, the hydrostatic type of engine lubricators have been provided with lubricant containers of such size that frequent manual filling thereof was necessary to their continued operation. This required frequent and watchful attention upon the part of the operator, and thereby consumed much time, while failure to maintain a sufficient supply of lubricant in the lubricator, resulted in burning out or otherwise seriously damaging the bearing or other wearing parts of the engine.

It is to overcome this necessity of frequently filling the lubricator and the burning out of bearings or other wearing parts of the engine or other apparatus to be lubricated, that my invention has been devised; and to that end one of the objects of my invention is, to provide an oiling system which will utilize steam pressure from a boiler to substantially automatically deliver a continuous, regulated supply of lubricant to the internal and external bearings of an engine and to any other operated machinery.

Another object is, to provide a system of this character which will effect a continuous, automatic and controlled lubrication of an engine and its connected machinery, without frequently refilling the reservoir supplying the fed lubricant.

Another object is, to provide a system of this character which will effect a continuous, automatic and controlled lubrication of an engine and connected machinery and which may be operably installed without any substantial alteration of the arrangement of the usual lubricator.

Another object is, to provide a system of this character which will effect a continuous automatic and regulated lubrication of the engine and machinery connected thereto and that shall embody controlling means adapted to effect the discontinuance of the operation of my system, when desired, and permit the continued lubrication of the engine independently, by any usual lubricator, without physical detachment of the system from the usual lubricator, or the disarrangement of the lubricator from its usual operative connection.

Another object is, to provide a system of this character which will not only supply a continuous, regulated, automatic feed of lubricant to an engine, but which will, at the same time, or independently thereof, supply a continuous, automatic, regulated feed of lubricant to machines driven by the engine or otherwise, to the extent of lubricating an entire factory.

Another object is, to provide a lubricating system of this character, which will supply and control the feed of lubricant to operating machinery in such a manner that an entire factory may thereby be lubricated, or that the lubrication of selected parts of the factory connected to the system may be discontinued or restored at will.

Another object is, to provide a lubricating system of this character which shall embody a substantially large lubricant reservoir that may be readily filled, interiorly cleaned or drained and which is provided with means to indicate the height of the contents thereof.

Another object is, to provide a lubricating system of this character which shall have such a substantially large lubricant reservoir so connected with pipes for appyling steam pressure internally thereto and with pipes for delivering a continuous, automatic, controlled flow of lubricant therefrom that with a minimum of attention by the engineer or operator a lubricant supply will be continuously, automatically controlled and fed to the wearing parts of the devices to be lubricated.

Another object is, to provide a lubricating system of this character which shall be efficient and automatic in its operation, which will permit complete control in the distribution of the lubricating material, which shall be of simple construction and of comparatively few parts, which may be adapted to the usual type of lubricator device without substantial disarrangement thereof and which may have other advantages and results, not herein specifically set forth.

My invention consists in the particular combination, organization and arrangement of parts shown in the accompanying drawings, described in the specification and more particularly defined in the appended claims.

In the drawings:

Fig. 1 is a diagrammatic view of my system attached to a well known type of lubricator as ordinarily installed in an engine steam feed pipe, showing the arrangement by which the steam chest and parts therein, and the bearings of the engine and other machinery may be automatically and continuously supplied with a controlled flow of lubricant; the course of the steam and of the lubricant being indicated by arrows.

Referring to the drawings, in which like numerals of reference indicate corresponding parts, a boiler 10 is connected in the usual manner to the steam supply pipe 11, which is also connected to the steam chest 12 of an engine 13 and supplies steam thereto. The supply pipe 11 is provided with a control valve 14, by means of which the supply of steam to the engine may be regulated or shut off. The lubricator 15 is connected in the usual manner to the steam supply pipe 11, between the boiler and the control valve 14, by means of the pipe 16, connected to the lubricator and to the steam pipe 11, and the pipe 17 connected to the steam pipe 11, and the pipe 18 which is connected to the pipe 17 and the condenser 19, which latter is connected by a coupling 20 to the lubricator.

The lubricator 15, as illustrated, is of any usual pattern and is provided with the usual sight gage 21, having the usual valve 22.

The lubricator 15 is also provided with the usual stand-pipe 23, communicating at its lower end with the lubricator body and at its upper end with the pipe 16. The stand-pipe 23 is provided with valves 24 and 25 to control its operation. The lubricator also has a valve 26 at its lower end for draining the lubricator of oil and water. The valve 27 is provided near the upper end of the lubricator for the purpose of controlling the flow of steam and oil between the condenser 19 and lubricator. The pipe 16 is provided with the valve 28 and the valve 29 is arranged at the junction of the pipes 17 and 18. The valve 28 may be operated to control the flow of steam and atomized globules of lubricant from the lubricator to the steam pipe 11 to lubricate the interior of the steam chest 12 of the engine 13. The valve 29 is utilized, when desired, to close the pipes 17 and 18 at their junction, to prevent the passage of steam from the boiler to the lubricator and prevent the flow of lubricant backwardly through the pipe 18 and the valve 29 and to the steam feed pipe 11 when and after my lubricating system is operatively coupled to the ordinary lubricator as shown. If my lubricating system became temporarily inoperative, the valve 29 might be opened and by a proper operation of other valves connected to my system, as will hereinafter be described, the lubrication of the steam chest 12 and the engine 13 could be accomplished in the usual manner by the lubricator 15, independently of my system.

Connected to the pipe 17, is a branch pipe 30, which is carried to the lubricant containing reservoir 31 and connects with the interior thereof, at its base 32, so that it may deliver steam pressure from the boiler to the interior of the reservoir 31 at the base portion 32 thereof. The branch pipe 30 is provided with a valve 33, to control, or if desired, to shut off the flow of steam from the boiler to the reservoir 31. Connected to the pipe 30 is a pipe 34, provided with a valve 35 of any usual pattern. The pipe 34 may be utilized to drain the reservoir 31 of water from the condensation of steam, or of the lubricating contents of the reservoir and may further be utilized to effectively provide a means by which the reservoir may be interiorly cleaned by the passage of steam thereinto from the top of the reservoir so that sediment or gummy accretion in the reservoir may be forced outwardly through pipe 34.

The reservoir 31 may be of any suitable type. It is illustrated as being substantially cylindrical, but must be substantially air, steam and oil tight and of sufficent strength to withstand the necessary pressure required to automatically force the lubricant therefrom through the distributing pipe systems connected thereto and to be hereinafter described. An inlet orifice 36 is provided by which the reservoir 31 may be supplied with lubricating material. I have shown this orifice as placed at the top of the reservoir, but it may be placed in any suitable operable position. The orifice 36 is provided with a detachable cap 37 which may be removed for the filling operation and replaced by securely threading it to the orifice to close the orifice and retain the reservoir in steam and air tight condition.

The reservoir 31 is also provided with an air outlet valve 40, shown as arranged at the top of the reservoir but which may be placed in any other suitable operative position. The valve 40 is utilized to permit the escape of air from the reservoir during the filling operation. The valve 40 may be of any suitable type, adapted for one way passage of air and may be of such construction as to prevent the leakage of lubricant or the escape of steam pressure necessary to operate my lubricant distributing system.

The reservoir 31 is also provided with a sight gage, comprising a glass or other suitable column 41, extending substantially the entire length or height of the reservoir, connected to the reservoir in the usual manner at either end, at the substantial top and bottom thereof by means of connections 42 and 43, which are provided with valves 44 and 45 to close the column 41 against the passage of lubricant or water therethrough from the reservoir. The sight gage is also provided at the lower end of the column 41 with a valve 46, by which the contents of the column may be drained, in order to effect or test its operation. Connected to the top of the reservoir 31 is a pipe 50 which is secured thereto by a coupling 51, so that an oil, steam and air tight joint thereat is provided. The pipe 50 extends from the reservoir 31 to the pipe 18, to which it is connected at the junction 52 and at a suitable point, is provided with a control or needle valve 53, to regulate the lubricant flow from the reservoir 31, through the pipe 50, the pipe 18 and through the lubricator 15 and the pipes 16 and 11, to the parts to be lubricated in the steam chest 12 of the engine 13.

Branching from the lubricant feed pipe 50 at the junction 54, a pipe 55 is carried to the engine and arranged so that it will automatically supply a controlled flow of lubricant to any of the external engine bearings. In my diagrammatic view, I have shown this pipe 55 leading to a drip valve 56, provided to lubricate the bearing 57 and the shaft 58 operating therein. This diagrammatic arrangement is intended to indicate that the external engine bearings may be lubricated through pipe 55 and that this may be accomplished, when a plurality of bearings are to be lubricated, by providing a plurality of suitably arranged branches from said pipe to lubricating cups or drip valves locally arranged at the points to be lubricated. The feed pipe 55 has a valve 60, by which the lubricant flow to the bearings or other points to be lubricated may be regulated and controlled or may be entirely shut off, if it is so desired.

Connected to the lubricant feed pipe 50, if suitable, at the junction 61, I provide a branch pipe 62 which is illustrated as led to a drip valve or lubricant feed cup to lubricate the bearing 64. The flow of lubricant to this bearing is automatic, continuous and controlled, similarly to the flow through the other lubricant feed pipe of my system. The pipe 62 is provided with a valve 66, to regulate and control the flow of lubricant through this pipe 62 and may be operated to completely stop the flow of lubricant therethrough. The portion of my diagrammatic view, which illustrates the means by which the bearing 64 is connected to and lubricated by my system, through the pipe 62, serves as an illustration of the means by which either a single bearing, or a plurality of bearings on a single apparatus, or how a plurality of machines, may be automatically connected and lubricated by my system.

To lubricate a plurality of operating devices or a complete plant, a single pipe, such as 62, may be led from the lubricant pipe 50 and provided with suitable branches, terminating at the machines to be lubricated, or a plurality of pipes may be led from the lubricant pipe 50 to the machines to be lubricated and may be operated in the manner above and hereinafter to be described.

After my system has been connected to the steam flow circuit from the boiler, by the pipe 30, the pipe 17, the steam feed pipe 11, the pipe 50, the pipe 18, connected to the lubricator 15, the pipe 16 joined to the steam feed pipe 11, the operation of my system will be as follows; the valves 33, 53 and 35 being closed the reservoir may then be filled with the desired lubricant.

To accomplish this, the cap 37 is removed from the filling orifice 36 and the reservoir 31 is charged therethrough with lubricant, the air exhausting out of the reservoir through the one way valve 40.

The valve 29 may then be closed, if during the charging of the reservoir, lubrication was being performed by the lubricator system comprising the usual lubricator 15 and its connecting pipes. The reservoir now being filled with lubricant and steam from the boiler passing in its course through the pipe 30, the valve 53, controlling the flow of the lubricant through the pipe 50 may be opened to permit the desired flow of lubricant. The valve 33 may then be opened and the flow of steam from the pipe 11 will take place, so that it passes through the pipe 17, to the valve 33 and the pipe 30 into the base of the reservoir 31, as indicated by the arrows and will there be condensed, if the temperature of the reservoir is below the steam making point.

The steam pressure thereby exerted from the boiler, through the pipes 11 and 30 upon the lubricant within the reservoir, will lift the lubricant therein and cause it to flow outwardly through the top thereof, through the pipe 50, the control valve 53, the pipe 18, the condenser 19, the lubricator 15, and thence, through the pipe 16 and the valve 28, into the steam pipe 11, through the valve 14 and into the steam chest 12 of the engine 13, to lubricate the wearing parts within the steam chest.

During the flow of lubricant through the pipe 50, a portion will be forced into the pipes 55 and 62. If the valves 60 and 66 therein are opened, the lubricant will flow therethrough to the drip cups or other lubricating devices 56 and 63, to lubricate the bearings 57, 64 and the shafts 58 and 65 respectively, operating therein. The flow of lubricant through the pipe 50, to the steam chest 12 of the engine 13 is controlled by a valve 53, which may be a needle valve, if a fine control of the lubricant supply is required. The valves 60 and 66, in the pipes 55 and 62 respectively, control the feed of lubricant through these pipes; and it will be understood that the valves 53, 60 and 66 may likewise be completely closed to stop the flow of lubricant through the pipes 55 and 62.

The valve 33 controls the flow of steam from the feed pipe 11 to the reservoir 31 and may be completely closed, if desired, to remove steam pressure from the reservoir and stop the flow of lubricant therefrom through the pipe 50. By the provision of the sight gage for the reservoir 31, the column 41 will indicate at all times the height of lubricant and condensed steam within the reservoir, so that the operator may keep the reservoir properly charged with lubricant.

To clean the reservoir as has hereinbefore been partially described, the valve 35 may be opened and any sediment and gummy accretion which may be in the reservoir can be drained therefrom. If it is desired to clean the interior of the reservoir with steam, this may be done by closing the valve 33, opening the valves 29 and 53 and by closing the valve 27. This will result in changing the normal path of the steam from the pipe 11, into pipe 17, through the valve 29, through the valve 53 and the pipe 50, which was the oil feed pipe in normal operation. It will be seen that the interior of the reservoir will therefore readily be steamed clean and undesired gummy matter or sediment be forced out therefrom through the pipe 34.

When this cleaning operation is completed, the valve 35 may be closed, the valve 53 opened to its normal condition, the valve 27 reopened, the valve 29 closed to its normal condition and the valve 23, in the steam feed pipe 30 reopened, so that the reservoir may be refilled, by the proper adjustment of the valves 33 and 53, and the removal of the valve cap 37.

While the engine 13 is in operation and the lubricator 15 is fed by my automatic lubricating feed system, the flow of steam and lubricant is as described. The wearing parts in the steam chest 12 are thus kept lubricated, partially because of a suction, or reverse pressure, that assists in drawing the lubricant from the pipe 16 into the pipe 11 and mixing it with the steam, which draws it into the steam chest. When, however, the valve 14 is closed and the engine thereby stopped, the flow of steam passing the point of connection between the pipe 11 and the pipe 16 ceases. The steam is then in a static condition and produces a back pressure into the pipe 16, approximately balancing the pressure of the steam in the pipe 30 upon the lubricant in the reservoir 31, so that, with the closing of the valve 14, the flow of lubricant from the pipe 16 into the pipe 11 automatically stops and any undesired accumulation of lubricant therein, which might otherwise result is prevented. The control of the lubricant flow to the steam chest 12, by the application of my system, as illustrated, is therefore completely automatic and stops with the stopping of the engine and the closing of the valve 14 and immediately supplies lubricant with the opening of the valve 14 and the actuation of the engine.

Although the control of lubricant flow through the pipes 55 and 62 is shown and described as effected manually, through the valves 60 and 66, yet, it is to be understood that by the provision of any automatic operating valve of any well known type, the flow of lubricant through the pipes 55 and 62 may be automatically controlled, by the starting and the stopping of the devices to which these pipes supply the lubricant.

It will be understood further that my system is one that can be connected and adapted to any usual lubricator arrangement, so that it may be used independently of my system if desired.

If it is desired to use the lubricator arrangement here illustrated independent of its connection with my system, this may be accomplished by closing the valves 33 and 53 and by opening the valve 29 which will then permit the usual operation of the shown lubricator system, independently of the system of my invention.

It will be further understood that the pressure of steam from the pipe 11 through the pipe 30, to the interior of the reservoir 31 may be readily regulated, by installing in the pipe 30 a reducing pressure valve 70, so that either the full boiler pressure, or any reduced degree thereof may be applied.

Although I have shown and described my system as applied to an ordinary type of lubricator, connecting it thereto by junction with the pipes 17 and 18, yet I may, if desired, eliminate the use of the lubricator arrangement comprising pipes 16, 17 and 18, the condenser 19 and the lubricator 15, and may connect the pipes 30 and 50 directly to the pipe 11 and operate my system independently of the lubricator arrangement comprising the lubricator 15.

I may likewise, if desired, provide a by-pass, not shown, around the lubricator 15 and the condenser 19, so that the lubricator 15 and the condenser 19 would be cut off from the path of the steam or lubricant. With the installation of the by-pass, the operation of my system would be substantially as efficient as the arrangement shown in the diagrammatic sketch herewith.

In order that an operator of my system may be able to visibly determine the adjustment of the needle control valve 53 and may see the amount of lubricant which is being permitted to flow to and through the condenser to the steam pipe 11 and the steam chest 12 of the engine 13 there may be, if desired, a sight plate or glass section installed in the oil feed pipe 50, between the valve 53 and the junction 52. This glass plate may be affixed into this section of the pipe 50 in any well known manner and will enable the operator to see the quantity of oil passing through the valve 53, and will aid in securing accurate adjustment of this valve to supply the proper amount of lubricant necessary.

Since the introduction of steam pressure takes place at the base of the reservoir 31 and under the usual conditions a body of water is there formed by the condensation of the admitted steam, this condensed steam, beside lifting the lubricant content of the reservoir and forcing it through the pipe 50, serves as a screen or filter, by which sediment impurities in the lubricant may be automatically removed therefrom and collected at the base of the reservoir for discharge by the cleaning process.

This result is effected by gravity downwardly drawing the sediment from the lubricant and collecting it in the water of condensation so that it will settle at the base of the reservoir.

When the water of condensation is drawn off through pipe 34, and reservoir cleaned by the blowing in of steam through pipe 50 this collected sediment will be removed and the interior of the reservoir restored to a desirable cleanly condition.

The water of condensation, not only delivers pressure upon the lubricant of the reservoir but in addition so carries the lubricant that it is substantially automatically filtered.

From the foregoing, it will be seen that I have provided a device by which, either the wearing parts in the steam chest of an engine or the exterior bearings thereof, or the bearings of any number of other machines, even to the extent of an entire plant, may be continuously supplied with an automatic and controlled lubrication; that may be connected with and adapted to any usual type of lubricator, to lubricate the interior of the steam chest of an engine, without disarrangement of the organization of said lubricator and will maintain a continuous flow of lubricant automatically to the lubricator; which may be operably disconnected from said lubricator arrangement, without physical detachment therefrom and permit lubrication to continue with the usual type of lubricator independent of my system; which is divisible into units, so that lubricant reservoirs embodied in my system may be installed in different suitable locations of a given plant; which is so combined with the steam feed system of the engine that the opening of the engine control valve will cause a flow of lubricant to the steam chest and a closing of the engine control valve will automatically stop the flow of lubricant to the steam chest; which is of such construction and arrangement that the reservoir may be readily filled and drained and that the interior of the reservoir may be thoroughly and readily cleaned by the application of steam thereto from the boiler; which is of such organization and construction, that it supplies a continuous automatic and controlled lubrication wherever desired, with the minimum of attention by the operator; which is of comparatively few parts, of positive and efficient operation, of comparatively cheap manufacturing cost and which has other advantages and results, not herein specifically set forth.

Having thus described my invention in detail and illustrated it in the accompanying drawings, I do not wish to be limited thereby, except as the state of the art and the appended claims may require, for it is obvious that various modifications and changes may be made in the arrangement, combination and organization of parts, without departing from the spirit and scope of my invention.

What I claim as new and desire to secure by Letters Patent is:

1. In a lubricating system for an engine and other elements requiring lubrication, the combination of a source of fluid pressure, a pipe for conducting fluid from the source to the engine to operate the latter, a lubricator connected to the pipe for supplying lubricant to the latter for the cylinder of the engine, a reservoir for lubricant, a pipe for conducting fluid from the source to the reservoir to force the lubricant therefrom, a pipe leading from the reservoir to the lubricator for supplying lubricant to the latter, and pipes connected to the last named pipe between the reservoir and the lubricator for conveying lubricant to the other elements.

2. In a lubricating system for an engine and other elements requiring lubrication, the combination of a source of fluid pressure, a pipe for conducting fluid from the source to the engine to operate the latter, a displacement lubricator connected to the pipe for supplying lubricant to the latter for the cylinder of the engine, a second displacement lubricator, a pipe for conducting fluid from the source to the second lubricator to force lubricant therefrom, a pipe leading from the second lubricator to the first lubricator for supplying lubricant to the latter and pipes connected to the last named pipe between the two lubricators for conveying lubricant to the other elements.

3. In a lubricating system for an engine and other elements requiring lubrication, the combination of a source of fluid pressure, a pipe for conducting fluid from the source to the engine to operate the latter, a lubricator, a condenser connected to the lubricator, a pipe leading from the first named pipe to the condenser, a pipe leading from the lubricator to the first named pipe for supplying lubricant to the latter for lubricating the cylinder of the engine, a reservoir for lubricant, a pipe for conducting fluid from the source to the reservoir to force lubricant therefrom, a pipe leading from the reservoir to the pipe leading from the first named pipe to the condenser for supplying lubricant to the lubricator and pipes connected to the last named pipe between the reservoir and the lubricator for conveying lubricant to other elements requiring lubrication.

4. In a lubricating system for an engine and other elements requiring lubrication, the combination of means whereby fluid pressure may be applied to the engine to operate the latter, a lubricator connected to the pressure-applying means for supplying lubricant to the latter for the cylinder of the engine, a reservoir for lubricant, means whereby fluid pressure may be applied to the reservoir to force the lubricant therefrom, a pipe leading from the reservoir to the lubricator for supplying lubricant to the latter and pipes connected to the last-named pipe between the reservoir and the lubricator for conveying lubricant to the other elements.

Signed at the city of New York in the county of New York and State of New York this 28th day of August, A. D. 1925.

GEORGE K. LISK.